United States Patent Office 3,095,358
Patented June 25, 1963

3,095,358
LIQUID CHILL PROOFING COMPOSITION
Heinrich Meister, Staten Island, N.Y., assignor to
Baxter Laboratories, Inc.
No Drawing. Filed Mar. 15, 1961, Ser. No. 95,788
5 Claims. (Cl. 195—63)

The present invention relates generally to the stabilizing and chillproofing of malt beverages. More particularly, it relates to a novel enzyme product for the treatment of malt beverages.

Fermented malt beverages such as beer and ale are today widely distributed in convenient individualized containers such as glass bottles and cans. Such containers, of course, are subject to a wide variety of temperature and other storage conditions for varying lengths of time that might adversely affect their contents. In addition, variable amounts of air which appears to have a particularly deleterious effect on the stability of malt beverage may enter the container during filling, thereby resulting in the reduction of the normal shelf-life of the beer and in the production of haze and turbidity.

It is, of course, necessary in order to obtain consumer acceptance, that the individual containers of malt beverage yield upon opening a product that is brilliant in visual appearance and pleasing in taste. Since the container prior to opening is stored for long periods of time under chilling conditions, it is necessary that the contents withstand such low temperature storage without change. It must also, of course, withstand the high temperature which may result during storage and the effects of oxidation, time and transportation.

To provide a beverage which persists in brilliant appearance and pleasant flavor throughout all such conditions, the brewing industry at the present time employs a procedure commonly known as "chill-proofing." Chillproofing comprises treating the beer or ale after fermentation with certain proteolytic enzymes. During the next phase, or pasteurization, the enzymatic activity is accelerated to break down the haze forming, high molecular weight, relatively insoluble proteinaceous compounds into soluble non-haze forming substances. A residual enzymatic activity which is effective to provide prolonged shelf-life usually remains after pasteurization.

In the past, chillproofing enzymes have been added to the beer in the form of dry, comminuted solids alone or in admixture with other solid materials. (See U.S. Patents 995,820; 995,823; 2,077,448 and 2,077,449). Such powdered enzyme products have been employed for a great number of years, even though it was generally recognized that a liquid form of enzyme, if stable, would possess marked advantages.

It is an object of the present invention to disclose a novel product for the treatment of beer.

It is further an object to disclose a novel stable liquid form of proteolytic enzyme which possesses superior, proteolytic activity when compared to equivalent solid enzyme products.

It has now been unexpectedly discovered that such a novel liquid form of proteolytic enzymes suitable for the chillproofing of malt beverages may be obtained by combining suitable proteolytic enzymes with sorbitol. Such a combination results in a product stable under a wide variety of conditions.

In the preferred embodiment of the present invention, a liquid papain concentrate is prepared by extracting 1 part of dried papaya latex having an activity of about 200–600 milk clotting units, with 10 parts of aqueous .08–.33% $H_2S$ solution and preferably filtering the mixture. The thus obtained filtrate is concentrated to about 50% solids under vacuum. One cc. of this concentrate has approximately the same proteolytic activity as one gram of the crude papain. A sufficient quantity of the liquid papain concentrate is then combined with an aqueous 80% sorbitol solution, containing suitable reducing agents and flavoring, to form a mixture containing 10–35% by weight of the concentrate. The thus resulting clear liquid composition may be stored for long periods of time without the formation of sedimentation or loss of enzymatic activity.

A liquid papain concentrate which is likewise suitable for use in the novel enzyme-sorbitol compositions of the present invention may be prepared by treating crude papain with an aqueous solution containing about 0.2–4.0% of available sulfur dioxide, preferably filtering and then concetrating the filtrate under vacuum to about 50% solids. It will be readily apparent, that if a product of lesser proteolytic activity is desired, the filtrate need not be concentrated, or a crude papain of lesser activity may be used.

The proteolytic activity of the crude papain and liquid papain concentrate (50% solids) are determined by the milk-clotting assay method as originated by Balls and Hoover (J. Biol. Chem. 121, 737; 1937), modified by Hinkel and Alferd (Ann. N.Y. Acad. Sci. 54, 211; 1951). The enzyme preparation is dissolved in a buffered cysteine hydrochloride solution of pH 6 and is tested at 40° C. with a 20% buffered milk solution previously standardized against a standard papain preparation of 300 units. The time required from the addition of the enzyme until clotting of the milk begins is measured. The results are expressed in "milk clotting units." The value thus received for the liquid concentrate usually approximates that of the crude papain.

The sorbitol content of the final solution may range in concentration considerably depending, of course, upon the amount of and aqueous content of the liquid papain concentrate. However, the preferred solution contains about 65 to 90% by weight of an 80% sorbitol solution.

While a wide variety of reducing agents may be employed in the novel compositions, the alkali metal sulfites such as sodium meta bisulfite are especially preferred. These reducing agents are preferably employed in an amount ranging from 0.25 to 3% by weight of the total liquid preparation.

The flavoring material may be chosen from any of the acceptable food flavors and are usually used in an amount of about 0.1% by weight of the total compound. Larger or smaller amounts of flavoring may also be employed if desired.

If desired, other enzymes may be added. In the one embodiment a small amount (about 1% or less by weight) of a mixture of bacterial protease and amylase obtained from the growth of *Bacillus subtilis* upon suitable media is incorporated. This product supplies additional proteolytic activity and significant amylolytic activity.

The present invention is further illustrated by reference to the following examples, some of which are for comparative purposes. In the examples all parts are expressed by parts by weight unless otherwise indicated.

*Example I*

A liquid papain concentrate having an activity of 350 milk clotting units was prepared by treating one part of crude commercial papain having an activity of 378 milk clotting units with 10 parts of an aqueous solution containing 0.08% of $H_2S$. The resulting mixture was then filtered and the filtrate concentrated under vacuum to 50% solids.

The following composition was then prepared:

| | Parts |
|---|---|
| Liquid papain concentrate | 25 |
| Sodium meta bisulfite | 2 |
| Food flavor | 0.09 |
| 80% sorbitol solution to make | 100 |

This composition was found to have 40% greater chillproofing activity than a dry powder product containing equivalent amounts of crude papain, sodium meta bisulfite and flavor.

After storage for one year the product was observed to be clear and free of sedimentation. Upon testing it was also found to have retained its original enzymatic activity.

*Example II*

Four compositions similar to that of Example I were prepared except that the 80% sorbitol was replaced with 70% sucrose solution, 70% propylene glycol solution, glycerine, corn syrup and 20% gum arabic solution, respectively.

The above compositions and the composition of Example I were then stored at room temperature. In the sucrose preparation a heavy sediment formed immediately. In the propylene glycol preparation a heavy sediment formed immediately. The gum arabic preparation also showed a sediment immediately although it was not as heavy. In the glycerol preparation a sediment formed after five days. In the corn syrup preparation a turbidity developed after storage for 2 weeks at room temperature which was followed by sedimentation. In contrast, the composition of Example I remained brilliant when stored at room temperature for over one year.

It will be readily apparent that in addition to superior chillproofing activity the compositions of the present invention provide several other important advantages. The liquid form is, of course, much more easily added to the liquid malt beverages and is distributed throughout the beverage more rapidly.

It will be readily understood that a wide variety number of changes and modifications may be made without departing from the spirit and scope of the present invention. For example, if a less elegant product is acceptable, papain itself may be dissolved in sorbitol and the mixture filtered to provide a usable liquid chillproofing product. Therefore, it is intended that the foregoing description be interpreted as merely illustrative and not limiting.

The embodiments of the present invention in which an exclusive property or privilege is claimed are as follows:

1. A composition for the chillproofing of malt beverages comprising a liquid mixture of papain and sorbitol, said mixture being stable at room temperatures for extended periods.

2. A composition for the chillproofing of malt beverages comprising a liquid papain concentrate and sorbitol, said mixture being stable at room temperatures for extended periods.

3. The compositon of claim 2 in which the liquid papain concentrate is present in an amount of 10% to 35% by weight.

4. A composition for the chillproofing of malt beverages comprising 10% to 35% by weight of a liquid papain concentrate and 65% to 90% by weight of an aqueous 80% sorbitol solution.

5. A chillproofing composition containing the following:

| | Parts |
|---|---|
| Liquid papain concentrate | 25 |
| Sodium meta bisulfite | 2 |
| Flavor | 0.09 |
| 80% sorbitol solution to make | 100 |

References Cited in the file of this patent

UNITED STATES PATENTS

| 2,061,560 | Brown | Nov. 24, 1936 |
| 2,152,602 | Ott | Mar. 28, 1939 |
| 2,164,936 | Miller et al. | July 4, 1939 |
| 2,916,377 | Shaler et al. | Dec. 8, 1959 |